United States Patent [19]
Perks et al.

[11] Patent Number: 6,041,180
[45] Date of Patent: Mar. 21, 2000

[54] SYSTEM AND METHOD FOR OPTIMIZING TEMPLATE OBJECT FILES

[75] Inventors: Michael Albert Perks, Austin; Mark Alvin Sehorne, Round Rock, both of Tex.

[73] Assignee: International Business Machines Corporation, Armonk, N.Y.

[21] Appl. No.: 08/848,629

[22] Filed: Apr. 28, 1997

[51] Int. Cl.$^7$ ...................................................... G06F 9/45
[52] U.S. Cl. ............................................................ 395/709
[58] Field of Search ............................................. 395/709

[56] References Cited

U.S. PATENT DOCUMENTS

| | | | |
|---|---|---|---|
| 5,642,514 | 6/1997 | Peckham .................................. | 395/709 |
| 5,790,867 | 8/1998 | Schmidt et al. ......................... | 395/709 |
| 5,812,854 | 9/1998 | Steinmetz et al. ...................... | 395/709 |

Primary Examiner—Emanuel Todd Voeltz
Assistant Examiner—John Chavis
Attorney, Agent, or Firm—Leslie A. Van Leeuwen

[57] ABSTRACT

The present invention provides a system and method to reuse code, and thus save code space within a program. A compiler and a linker work together to decide which object code to reuse, for implementation of template classes, and other repetitive code segments. The compiler notes in the object file which functions are generated from template code, or other repetitive types of code. An intelligent linker then attempts to match code, and in the cases where the code matches, simply eliminates multiple versions of the same code by aliasing the function names. The compiler can reduce the amount of linker searching by storing a cyclic redundancy check (CRC) code with each method. By using the system and method of the present invention, code reuse is made possible without sacrificing program efficiency.

27 Claims, 2 Drawing Sheets

SYSTEM AND METHOD FOR OPTIMIZING TEMPLATE OBJECT FILES

FIELD OF THE INVENTION

The invention relates to the field of information handling systems, and, more particularly, to a system and method for optimizing template object files used by program code executing in the information handling system.

BACKGROUND OF THE INVENTION

In an object-oriented programming language, such as C++, a class template defines the layout and operations for unbounded sets of related types. Templates provide a strongly-typed "macro" facility, and promote source code re-use. For example, a single class template for a stack might provide a common definition for a stack of integers, a stack of floats, or a stack of pointers to char strings. A template may be used by an individual program to implement an object, such as a stack. Rather than writing code to implement the stack, the programmer can simply use a stack template. Thus, templates reduce the amount of source code that programmers need to write, and promote code reuse.

The problem with the implementation of templates is that while the object code for different template class declarations may be similar, or even identical, the object code is not reused, where possible, for each different template class declaration. This means that every time a programmer defines and uses a different stack class, the template code is inserted into the program. This results in duplicate code being included in the program.

Consequently, it would be desirable to have a system and method for reusing code, where possible, to reduce the size of the program. It would also be desirable to have a system and method for reusing code which would have a negligible impact on the efficiency of the code.

SUMMARY OF THE INVENTION

Accordingly, the present invention provides a system and method to reuse code, and thus save code space within a program. A compiler and a linker work together to decide which object code to reuse, for implementation of template classes, and other repetitive code segments.

The compiler notes in the object file which functions are generated from template code, or other repetitive types of code. An intelligent linker then attempts to match code, and in the cases where the code matches, simply eliminates multiple versions of the same code by aliasing the function names. The compiler can reduce the amount of linker searching by storing a cyclic redundancy check (CRC) code with each method (note that a method is a procedure or routine associated with a class). Testing will show whether the CRC is sufficient or if the linker needs to perform a more exact match.

One of the embodiments of the invention is as sets of instructions resident in an information handling system.

The system and method of the present invention can be used by any compiler and linker to optimize generated object code. One advantage of the invention is that code is optimized so as to save code space in a program. Another advantage of the present invention is that true code reuse is made possible without sacrificing program efficiency.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
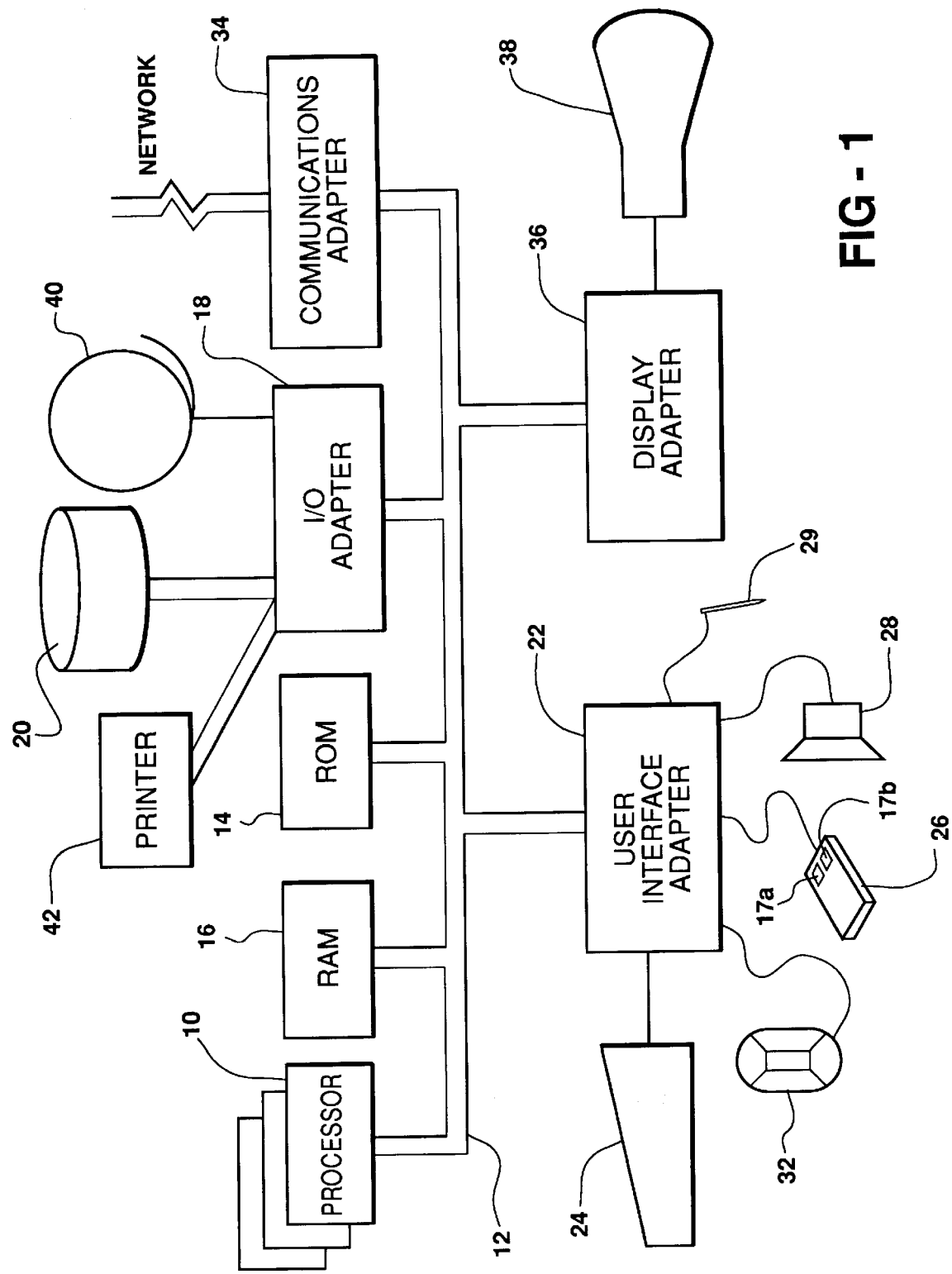
FIG. 1 is a block diagram of an information handling system capable of executing the optimization method of the present invention.

The invention may be implemented on a variety of hardware platforms, including personal computers, workstations, mini-computers, and mainframe computers. Many of the steps of the method of the present invention may be advantageously implemented on parallel processors of various types. Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20, tape drives 40, and printers 42 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38. Communication adaptor 34 may link the system depicted in FIG. 1 with hundreds or even thousands of similar systems, or other devices, such as remote printers, remote servers, or remote storage units.

The invention will be described with reference to optimizing C++ template object files. However, the system and method of the present invention may be used with any compiler, and any type of repetitively generated code.

An example class template definition for a stack is illustrated by the following C++ code:

```
#ifndef __STACK_TPL_H
#define __STACK_TPL_H
template<class T>
class stack
{
private:
    T*  v;
    T*  p;
    int sz;
public:
    stack(int);
    ~stack( );
    void push(T);
    T pop( );
    int getSize( );
};
#endif
```

Note that the identifier T represents the template type. The class implementation for the above stack is as follows:

```
template<class T>stack<T>::stack(int s)
{
    v = p = new T[sz=s];
}
template<class T>stack<T>::~stack( )
{
    delete [] v;
}
template<class T> void stack<T>::push(T a)
{
    *p++ = a ;
}
template<class T> T stack<T>::pop ( )
{
    return *(--p);
}
template<class T> int stack<T>::getSize( )
{
    return sz;
}
```

Different declarations (i.e. template classes) of this class template are defined as follows:

```
#include "stk.h"
typedef char              *pCHAR;
typedef unsigned short    *pUSHORT;
typedef int               *pINT;
typedef unsigned int      *pUINT;
stack<unsigned int>       dummy0(10);
stack<int>                dummy1(10);
stack<unsigned short>     dummy2(10);
stack<pCHAR>              dummy3(10);
stack<PUSHORT>            dummy4(10);
stack<pINT>               dummy5(10);
stack<pUINT>              dummy6(10);
```

The stack class for integers can be used as follows:

```
#include <iostream.h>
#include "stk.h"
int main(void)
{
    stack<int> s(10);
    cout << "Pushing the sequence of numbers: 2 4 1 3\n";
    s.push(2);
    s.push(4);
    s.push(1);
    s.push(3);
    cout << "Popping the numbers:expecting 3 1 4 2\n";
    cout << "Sequence from Pop operations: ";
    cout << s.pop( ) << ' ';
    cout << s.pop( ) << ' ';
    cout << s.pop( ) << ' ';
    cout << s.pop( ) << '\n';
    return 0;
}
```

When code is compiled, C++ compilers typically repeat the code for each method (e.g. push, pop, etc.) even if it is independent of the type (i.e. int, char, etc.) used for the template. In some cases, the code does need to be different because of differences in the type used in the template class declaration. However, in many cases the code will be identical, or nearly identical.

For example, the generated assembly code for the pop() method for each of the different types is shown below:

```
unsigned int:

pop_stackXTUi_Fv proc
    mov     ecx,eax
    mov     eax,[ecx+04h]
    lea     edx,[eax-04h]
    mov     [ecx+04h],edx
    mov     eax,[eax-04h]
    ret
pop_stackXTUi_Fv endp
int:

pop_stackXTi_Fv proc
    mov     ecx,eax
    mov     eax,[ecx+04h]
    lea     edx,[eax-04h]
    mov     [ecx+04h],edx
    mov     eax,[eax-04h]
    ret
pop_stackXTi_Fv endp
unsigned short:

pop_stackXTUs_Fv proc
    mov     edx,eax
    push    ebx
    mov     ecx,[edx+04h]
    xor     eax,eax
    lea     ebx,[ecx-02h]
    mov     [edx+04h],ebx
    pop     ebx
    mov     ax,[ecx-02h]
    ret
pop_stackXTUs_Fv endp
char:

pop_stackXTc_Fv proc
    mov     edx,eax
    push    ebx
    mov     cx,[edx+04h]
    xor     eax,eax
    lea     bx,[ecx-01h]
    mov     [edx+04h],ebx
    pop     ebx
    mov     a1,[ecx-01h]
    ret
pop_stackXTc_Fv endp
```

Note that the generated code for unsigned int and int is exactly the same. This is not unexpected as the size of the type is the same (i.e. 4 bytes each). The code for unsigned short and char is different, as expected, because an unsigned int is only two bytes in size and a char is only one byte in size.

As shown below, the generated code for all the pointer types are the same, as is the code for unsigned int and int:

```
pointer to unsigned int:

pop_stackXTPUi_Fv proc
    mov     ecx,eax
    mov     eax,[ecx+04h]
    lea     edx,[eax-04h]
    mov     [ecx+04h],edx
    mov     eax,[eax-04h]
    ret
pop_stackXTPUi_Fv endp
pointer to int:

pop_stackXTPi_Fv proc
    mov     ecx,eax
    mov     eax,[ecx+04h]
    lea     edx,[eax-04h]
    mov     [ecx+04h],edx
```

```
                mov      eax,[eax-04h]
                ret
        pop_stackXTPi_Fv endp
        pointer to unsigned short:

pop_stackXTPUs_Fv proc
                mov      ecx,eax
                mov      eax,[ecx+04h]
                lea      edx,[eax-04h]
                mov      [ecx+04h],edx
                mov      eax,[eax-04h]
                ret
        pop_stackXTPUs_Fv endp
        pointer to char:

pop_stackXTPc_Fv proc
                mov      ecx,eax
                mov      eax,[ecx+04h]
                lea      edx,[eax-04h]
        1.               mov [ecx+04h],edx
                mov      eax,[eax-04h]
                ret
        pop_stackXTPc_Fv endp
```

The generated code for the getSize( ) method is also the same regardless of which template class is declared. In addition, the generated code for the constructor and destructor methods are the same regardless of which template class is declared.

Two principles arise from these examples:

1. The generated code is the same if the template type is not used in the method.
2. The generated code is usually the same if the size of the template types is the same.

Based on the above principles, the present invention provides a system and method which can be used by compilers and linkers to reuse object code, where possible, for implementation of template classes. The compiler notes in the object file which functions are generated from template code. The intelligent linker then attempts to match code, and in the cases where the code matches, simply eliminates multiple versions of the same code by aliasing the function names. The compiler can reduce the amount of linker searching by storing a cyclic redundancy check (CRC) with each method. Testing with various test cases will show whether the CRC is sufficient, or if the linker needs to perform a more exact match. The actual implementation will of course be compiler specific, however, an example is illustrated below with reference to FIG. 2.

The present invention is especially beneficial when optimizing class templates in which the methods perform data manipulation not directly tied to the template type. A common example is collection classes in which most methods are concerned with walking the collection, and only a few methods deal with adding, deleting or finding elements in the collection.

In addition, implementations of class libraries may be modified to derive the most benefit from the described optimization. For example, parameters that are template types can be converted to pointers before calling a relatively large implementation function. This results in only the wrapper function being different for each template type.

Figure 2:
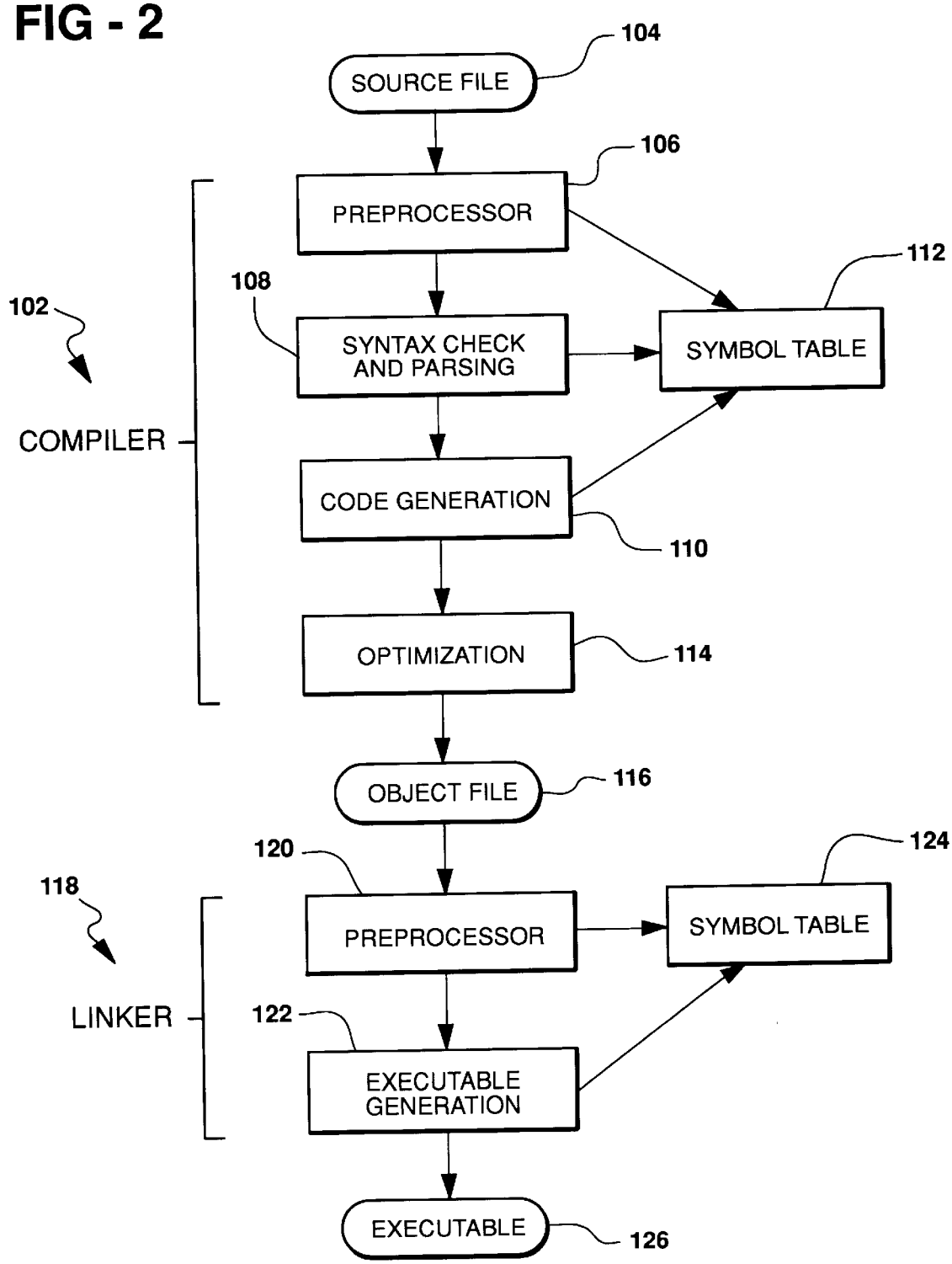
FIG. 2 is a flow chart depicting the steps of compiling and linking code.

Referring now to FIG. 2, a method of compiling and linking code according to the present invention will be described. During the compile phase 102, a source file 104 is processed through a preprocessor 106, a syntax checker and parser 108, and a code generator 110. The preprocessor 106, syntax checker and parser 108, and code generator 110 produce a symbol table 112. The generated code is then optimized 114 and an object file 116 is produced.

During the linking phase 118, one or more object files 116 are linked together by being processed through a preprocessor 120 and an executable generator 122. Symbol table 124 is used for resolving linkages (i.e. collecting global names and resolving them). In addition, symbol table 124 is also used to collect and store all comment records found. The comment records are used to identify template object code, and are described more fully below. Finally, an executable code module 126 is created.

For the purposes of this example, assume the stack template implementation is in a file referred to as STK.CPP, and the following code snippet is from a source file 104, referred to as TEST.CPP:

```
#include <iostream.h>
#include "stk.h"
stack<int> i(10);
stack<unsigned short *> s(10);
i.push(1);
i.push(2);
unsigned short j = 1;
s.push (&j);
j = 2;
s.push (&j);
cout << i.getSize( ) << "elements in integer stack\n";
cout << s.getSize ( ) <<
        "elements in unsigned short pointer stack\n";
```

When TEST.CPP is compiled, three object files 116 are produced, one for TEST.CPP and one for each of the different invocations of the stack template class. Assume that the template file objects for each of the two separate invocations are named STK1.OBJ and STK2.OBJ.

During the compiler phase 102, the compiler adds a comment record to each object file for each template function. The exact point at which the compiler adds the comment records will of course be compiler-dependent. The comment record contains the template filename, line number, function name and CRC (or checksum) for the object code. For example, STK1.OBJ contains:

| filename | line number | CRC  | function          |
|----------|-------------|------|-------------------|
| STK1.OBJ | 1           | 8D23 | _C_stack_Fv       |
| STK1.OBJ | 6           | CAA1 | _D_stack_Fv       |
| STK1.OBJ | 10          | 3A1F | push_stack_Fi     |
| STK1.OBJ | 15          | 4A2C | pop_stack_XTi_Fv  |
| STK1.OBJ | 20          | 1CAD | getSize_stackXTi_Fv | and STK2.OBJ contains:

| filename | line number | CRC  | function              |
|----------|-------------|------|-----------------------|
| STK2.OBJ | 1           | 8D23 | _C_stack_Fv           |
| STK2.OBJ | 6           | CAA1 | _D_stack_Fv           |
| STK2.OBJ | 10          | 3A1F | push_stack_FPUs       |
| STK2.OBJ | 15          | 4A2C | pop_stackXTPUs_Fv     |
| STK2.OBJ | 20          | 1CAD | getSize_stackXTPUs_Fv |

During the preprocessor step 120 of the linker phase 118, the linker stores these comment records in symbol table 124. During the executable generation step 122 of the linker phase 118, the comment records in the object files are searched for common template code. The exact point in step 122 where this searching takes place will be linker-specific. The speed of this search is improved by using the CRC. If two CRC codes are equal, it is very likely that the bytes of code used to generate the CRC codes are also the same. Thus, if the linker finds matching CRC codes, it will then compare the actual instructions to determine if the underlying code is the same.

If a match is found, the linker creates a duplicate set of entry points in the executable code that aliases the found function and adjusts the addresses to the new function name. In the described example, the mapping would now be:

| filename | line number | CRC | function |
|---|---|---|---|
| STK1.OBJ | 1 | 8D23 | __C__stack__Fv |
| STK1.OBJ | 6 | CAA1 | __D__stack__Fv |
| STK1.OBJ | 10 | 3A1F | push__stack__Fi |
| STK1.OBJ | 15 | 4A2C | pop__stack__XTi__Fv |
| STK1.OBJ | 20 | 1CAD | GetSize__stackXTi__Fv |
| STK2.OBJ | 1 | 8D23 | __C__stack__Fv |
| STK2.OBJ | 6 | CAA1 | __D__stack__Fv |
| STK2.OBJ | 10 | 3A1F | push__stack__FPUs |
| STK2.OBJ | 15 | 4A2C | pop__stackXTPUs__Fv |
| STK2.OBJ | 20 | 1CAD | getSize__stackXTUs__Fv |

The duplicate comment records for STK2.OBJ are also invalidated, as object STK1.OBJ has been used for resolving all symbol names and references.

| filename | line number | CRC | function |
|---|---|---|---|
| STK2.OBJ | — | — | — |
| STK2.OBJ | — | — | — |
| STK2.OBJ | — | — | — |
| STK2.OBJ | — | — | — |
| STK2.OBJ | — | — | — |

In the example shown, 50% of the code has been eliminated, thus saving significant code space. For each of the stack functions (i.e. constructor, destructor, push, pop, and getSize), there is only one entry point in the executable code. For example, a call to push an integer onto the integer stack (i.e. i.push(1) and i.push(2) in the original source code) will call the same executable code as will a call to push a pointer to an unsigned short onto the pointer to unsigned short stack (i.e. s.push(&j) in the original source code). For every function where the sets of instructions are the same, only one set of instructions is present in the executable module.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method of generating an executable program, comprising the steps of:

compiling one or more source files to generate an object file for each source file, wherein said compiling step includes the step of adding a comment record to each object file;

searching each object file to determine if there are one or more repeated sets of instructions; and linking the object files together to create an executable module, wherein the executable module contains one copy of each repeated set of instructions.

2. A method according to claim 1, wherein said comment record contains a name and a location of one or more potentially repeated sets of instructions.

3. A method according to claim 1, wherein said comment record contains a file name, a line number, a cyclic redundancy check, and a function name.

4. A method according to claim 1, wherein said compiling step further comprises the step of calculating a cyclic redundancy check code for every potentially repeated set of instructions.

5. A method according to claim 4, wherein said searching step comprises the steps of:

searching each object file to determine if there are one or more matching cyclic redundancy checks; and if matching cyclic redundancy checks are found, comparing the sets of instructions associated with the matching cyclic redundancy checks to determine if the sets of instructions are identical.

6. A method according to claim 1, wherein said linking step further comprises the steps of:

creating a duplicate set of entry points in the executable module for each repeated set of instructions found during said searching step; and adjusting addresses of one or more function calls in the executable module to transfer control to the one copy of a repeated set of instructions.

7. An information handling system, comprising:

one or more processors;

storage means;

input/output means;

display means;

one or more images of an operating system for controlling operation of said processors;

means for compiling one or more source files to generate an object file for each source file, wherein said means for compiling includes means for adding a comment record to each object file;

means for searching each object file to determine if there are one or more repeated sets of instructions; and means for linking the object files together to create an executable module, wherein the executable module contains one copy of each repeated set of instructions.

8. An information handling system according to claim 7, wherein said comment record contains a name and a location of one or more potentially repeated sets of instructions.

9. An information handling system according to claim 7, wherein said comment record contains a file name, a line number, a cyclic redundancy check, and a function name.

10. An information handling system according to claim 7, wherein said means for compiling further comprises means for calculating a cyclic redundancy check for every potentially repeated set of instructions.

11. An information handling system according to claim 10, wherein said means for searching comprises:
   means for searching each object file to determine if there are one or more matching cyclic redundancy checks; and
   if matching cyclic redundancy checks are found, means for comparing the sets of instructions associated with the matching cyclic redundancy checks to determine if the sets of instructions are identical.

12. An information handling system according to claim 7, wherein said means for linking further comprises:
   means for creating a duplicate set of entry points in the executable module for each repeated set of instructions found by said means for searching; and
   means for adjusting addresses of one or more function calls in the executable module to transfer control to the one copy of a repeated set of instructions.

13. A computer-readable medium, comprising:
   means for compiling one or more source files to generate an object file for each source file, wherein said means for compiling further includes means for adding a comment record to each object file;
   means for searching each object file to determine if there are one or more repeated sets of instructions; and
   means for linking the object files together to create an executable module, wherein the executable module contains one copy of each repeated set of instructions.

14. A computer-readable medium according to claim 13, wherein said comment record contains a name and a location of one or more potentially repeated sets of instructions.

15. A computer-readable medium according to claim 13, wherein said comment record contains a file name, a line number, a cyclic redundancy check, and a function name.

16. A computer-readable medium according to claim 13, wherein said means for compiling further comprises means for calculating a cyclic redundancy check for every potentially repeated set of instructions.

17. A computer-readable medium according to claim 16, wherein said means for searching comprises:
   means for searching each object file to determine if there are one or more matching cyclic redundancy checks; and
   if matching cyclic redundancy checks are found, means for comparing the sets of instructions associated with the matching cyclic redundancy checks to determine if the sets of instructions are identical.

18. A computer-readable medium according to claim 15, wherein said means for linking further comprises:
   means for creating a duplicate set of entry points in the executable module for each repeated set of instructions found by said means for searching; and
   means for adjusting addresses of one or more function calls in the executable module to transfer control to the one copy of a repeated set of instructions.

19. A method of generating an executable program, comprising the steps of:
   compiling one or more source files to generate an object file for each source file;
   searching each object file to determine if there are one or more repeated sets of instructions;
   linking the object files together to create an executable module, wherein the executable module contains one copy of each repeated set of instructions, and wherein said linking step includes the steps of:
      creating a duplicate set of entry points in the executable module for each repeated set of instructions found during said searching step; and
      adjusting addresses of one or more function calls in the executable module to transfer control to the one copy of a repeated set of instructions.

20. A method according to claim 19, wherein said compiling step further comprises the step of calculating a cyclic redundancy check code for every potentially repeated set of instructions.

21. A method according to claim 20, wherein said searching step comprises the steps of:
   searching each object file to determine if there are one or more matching cyclic redundancy checks; and
   if matching cyclic redundancy checks are found, comparing the sets of instructions associated with the matching cyclic redundancy checks to determine if the sets or instructions are identical.

22. An information handling system, comprising:
   one or more processors;
   storage means;
   input/output means;
   display means;
   one or more images of an operating system for controlling operation of said processors;
   means for compiling one or more source files to generate an object file for each source file;
   means for searching each object file to determine if there are one or more repeated sets of instructions;
   means for linking the object files together to create an executable module, wherein the executable module contains one copy of each repeated set of instructions, and wherein said means for linking further includes:
      means for creating a duplicate set of entry points in the executable module for each repeated set of instructions found by said means for searching; and
      means for adjusting addresses of one or more function calls in the executable module to transfer control to the one copy of a repeated set of instructions.

23. An information handling system according to claim 22, wherein said means for compiling further comprises means for calculating a cyclic redundancy check for every potentially repeated set of instructions.

24. An information handling system according to claim 23, wherein said means for searching comprises:
   means for searching each object file to determine if there are one or more matching cyclic redundancy checks; and
   if matching cyclic redundancy checks are found, means for comparing the sets of instructions associated with the matching cyclic redundancy checks to determine if the sets of instructions are identical.

25. A computer-readable medium, comprising:
   means for compiling one or more source files to generate an object file for each source file;
   means for searching each object file to determine if there are one or more repeated sets of instructions; and
   means for linking the object files together to create an executable module, wherein the executable module contains one copy of each repeated set of instructions, and wherein said means for linking includes:
      means for creating a duplicate set of entry points in the executable module for each repeated set of instructions found by said means for searching; and means for adjusting addresses of one or more function calls in the executable module to transfer control to the one copy of a repeated set of instructions.

26. A computer-readable medium according to claim 25, wherein said means for compiling further comprises means for calculating a cyclic redundancy check for every potentially repeated set of instructions.

27. A computer-readable medium according to claim 26, wherein said means for searching comprises:

means for searching each object file to determine if there are one or more matching cyclic redundancy checks; and if matching cyclic redundancy checks are found, means for comparing the sets of instructions associated with the matching cyclic redundancy checks to determine if the sets of instructions are identical.

\* \* \* \* \*